Patented Sept. 4, 1951

2,566,807

UNITED STATES PATENT OFFICE 2,566,807

METHOD OF PREPARING CHLORO-FLUOROETHYLENES

John J. Padbury, Stamford, Conn., and Paul Tarrant, Alachua County, Fla., assignors to American Cyanamid Company, New York, N. Y., a corporation of Maine No Drawing. Application April 23, 1947,
Serial No. 743,466

3 Claims. (Cl. 260—653)

This invention relates to the preparation of chlorofluoroethylenes. More particularly the invention is concerned with a method of preparing a chlorofluoroethylene which comprises heating, at a temperature of at least about 440° C. but below the temperature of decomposition of the chlorofluoroethylene, a chlorofluoroethane represented by the general formula I 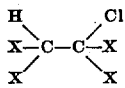

where X represents a member of the class consisting of chlorine and fluorine, at least one of which is a chlorine atom and at least two of which are fluorine atoms attached to the same carbon atom, more particularly compounds having the formulas $CCl_3$—$CHF_2$, $CHCl_2$—$CF_2Cl$, $CF_2Cl$—$CHFCl$, and $CHF_2$—$CFCl_2$, and isolating, e. g., by distillation, from the resulting mass a chlorofluoroethylene represented by the general formula II 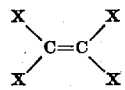

where X has the meaning above given. The chlorofluoroethane may be heated while admixed with or in an atmosphere containing air or oxygen; or while admixed with or in an atmosphere of nitrogen, argon, helium, carbon dioxide or other inert gas; or while admixed with or in an atmosphere of such gases as, for example, chlorine, hydrogen chloride and mixtures thereof. The products of the method vary with the particular chlorofluoroethane which is pyrolyzed or dehydrochlorinated and may be either 1,1-dichloro-2,2-difluoroethylene ($CCl_2$=$CF_2$) or chlorotrifluoroethylene ($CClF$=$CF_2$). Surprisingly, the dehydrochlorination proceeds without marked (if any) polymerization of the chlorofluoroethylene products of the reaction. The present invention is directed specifically to a new and improved method, in the manufacture of chlorotrifluoroethylene having the formula III 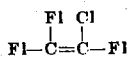

from dichlorotrifluoroethanes having the formula

IV 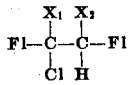

wherein $X_1$ and $X_2$ are substituents selected from the class consisting of fluorine and chlorine, specifically 1,1-dichloro-1,2,2-trifluoroethane and 1,2-dichloro-1,1,2-trifluoroethane, said method comprising heating said dichlorotrifluoroethanes to a temperature between 525° C. and 800° C. until thermal dehydrochlorination is effected, and separating the chlorotrifluoroethylene from the resulting mass so obtained.

It was suggested prior to our invention that chlorinated hydrocarbons which contain two carbon atoms in the molecule and also contain the grouping —CHCl—CHCl—, e. g., ethylene dichloride, symmetrical tetrachloroethane and 1,1,2-trichloroethane, be heated in the vapor state while admixed with from ½ to 1% by weight thereof of oxygen to a temperature of 300°–500° C. thereby to split off hydrogen chloride and to obtain a chlorinated ethylene or mixtures thereof, e. g., vinyl chloride, trichloroethylene and mixtures of symmetrical dichloroethylenes.

Chlorofluoroethylenes, e. g., $CHCl$=$CF_2$ and $CCl_2$=$CF_2$, previously have been prepared by chemical dehydrochlorination of the appropriate chlorofluoroethane using, for instance, sodium hydroxide, potassium hydroxide or sodium ethoxide as the chemical dehydrochlorination agent. They also have been prepared by dechlorination of the appropriate chlorofluoroethane in the presence of, for example, metallic zinc. Such methods are costly, time-consuming, are not readily adapted for continuous operations and, in the case of chemical dehydrochlorination, give low yields per treatment and frequently form undesired by-products. Furthermore, because of the nature of the reaction mass, it is difficult to isolate the chlorofluoroethylenes therefrom when the prior methods are used.

The present invention is based on our discovery that 1,1-dichloro-2,2-difluoroethylene and chlorotrifluoroethylene can be produced rapidly, at a relatively low cost and in a continuous operation by heating chlorofluoroethanes of the kind embraced by Formula I in a manner such as is briefly described in the first paragraph of this specification and more fully hereafter.

When two fluorine atoms are joined to a single carbon atom, there is a change in the electronic configuration around the carbon atom, thereby generally deactivating the other constituent that is on the carbon atom and rendering difficult the reaction of the compound with those same chemical reagents which might be used if some halogen other than fluorine were present. Because of the presence of the two fluorine atoms on the same carbon atom, this same deactivating effect of the fluorine upon the other constituent (hydrogen or chlorine) of a chlorofluoroethane of the kind embraced by Formula I normally would be expected upon attempting to dehydrochlorinate the same under heat. We have surprisingly found that in such chlorofluoroethanes containing two fluorine atoms attached to the same carbon atom, dehydrochlorination thereof under heat to yield the corresponding chlorofluoroethylenes can be effected rapidly and economically without the formation of any significant amounts of undesired by-products. Moreover the dehydrochlorination takes place without the elimination of any marked amount of HF, which likewise was unobvious and unpredictable.

In view of the known facts, such as have been mentioned above, about compounds having two fluorine atoms attached to the same carbon atom, it was quite unexpected and in no way could have been predicted that compounds of the kind embraced by Formula I could be dehydrochlorinated under heat to yield the corresponding chlorofluoroethylenes. It also was unexpected and in no way could have been predicted that such products could be obtained without marked polymerization or degradation thereof, especially since it is known that certain perhalogenated ethylenes, e. g., chlorotrifluoroethylene, undergo polymerization (e. g., dimerization, trimerization, etc.) as well as disproportionation (that is, a change in percentage composition), and degradation reactions when heated by themselves at temperatures of the same order as are employed in the dehydrohalogenation of the corresponding halogenated ethane.

1,1-dichloro-2,2-difluoroethylene embraced by Formula II is prepared, for example, by heating a trichlorodifluoroethane in which the hydrogen atom and at least one of the chlorine atoms thereof are each attached to different carbon atoms and both fluorine atoms are attached to the same carbon atom, more particularly compounds having the formulas $CCl_3$—$CHF_2$ and $CHCl_2$—$CF_2Cl$, at a temperature of at least about 440° C. and below the temperature of decomposition of the chlorofluoroethylene, more particularly at a temperature of about 500° to about 800° C., and isolating 1,1-dichloro-2,2-difluoroethylene from the resulting reaction mass. Depending upon the particular equipment employed and other influencing factors the upper temperature limit in some cases advantageously may be only 750° C. or even as low as 600° C. In preparing chlorotrifluoroethylene by heating a dichlorotrifluoroethane in which the hydrogen atom and at least one of the chlorine atoms are each attached to different carbon atoms, more particularly 1,1 - dichloro-1,2,2 - trifluoroethane ($CFCl_2$—$CHF_2$) and 1,2-dichloro-1,2,2-trifluoroethane ($CHFCl$—$CClF_2$), the temperature of conversion or pyrolysis advantageously is maintained within the range of about 525° to about 800° C., more particularly within the range of 550° to 750° C. Good results have been obtained in the dehydrochlorination of 1,1-dichloro-1,2,2-trifluoroethane to yield chlorotrifluoroethylene by using a pyrolysis temperature of 550° to 600° C.

The period of time the chlorofluoroethane is at the reaction or conversion temperature in all cases is sufficient to cause pyrolysis or dehydrochlorination to take place. For example, the time of heating at the aforementioned temperatures may be from 1 to 100 seconds.

The dehydrochlorination reactions described above may be effected in an inert atmosphere, e. g., an atmosphere of nitrogen, argon, helium, carbon dioxide, etc., or in the presence of oxygen or air. The starting chlorofluoroethane also may be heated as above described while admixed with or in an atmosphere of other agents in gaseous or vapor state, e. g., carbon tetrafluoride, dichlorodifluoromethane, trifluoroethane, trichlorotrifluoroethane, etc. Chlorine or gaseous hydrochloric acid or mixtures thereof may be introduced with the feed to the reaction zone, e. g., a pyrolysis tube, to facilitate the dehydrochlorination reaction. Thus, chlorine may be employed as a catalyst for the reaction. Such an agent may constitute, for example, from 0.1 to 20% or more by volume of the material undergoing pyrolysis.

The conversion may be effected by continuous, semi-continuous or batch operations at atmospheric, subatmospheric or superatmospheric pressures, but atmospheric pressures and continuous or semi-continuous operations are preferred.

The reaction vessel or tube may be formed of any suitable material, preferably a corrosion-resistant material, for instance, nickel, nickel alloys (e. g., nickel-copper-iron alloys, nickel-copper aluminum-silicon alloys, etc.), silver, platinum, glass, etc., and may or may not contain suitable packing, e. g., Raschig rings, to increase the surface area in the reaction zone. If desired, a solid catalyst may be used in the reaction zone, e. g., barium chloride, which advantageously is supported on a suitable carrier, for instance activated charcoal.

In order that those skilled in the art better may understand how to practice the present invention, the following examples are given by way of illustration and not by way of limitation.

EXAMPLE 1

Preparation of chlorotrifluoroethylene

The apparatus consisted of a reservoir for feeding the starting material at a constant rate into a vaporizer maintained at 180° C. From the vaporizer the vapors passed into a Pyrex glass tube (18 mm. inside diameter), which was packed with 4 mm. glass beads and was heated over a 90 cm. length by means of an electric furnace. A glass thermocouple-well ran through the center of the pyrolysis tube and was surrounded by the bead packing. The effluent gases from the reaction tube were collected in traps maintained at —78° C. by means of Dry Ice.

After flushing out the apparatus with an inert gas, specifically nitrogen, 1,1-dichloro-1,2,2-trifluoroethane was fed to the vaporizer at a rate of 0.39 mole per hour while maintaining the reaction tube at 566° to 572° C. The amount of hydrogen chloride in the gases that passed through the Dry Ice traps was determined at intervals by titration and found to correspond, as an average, to 33% dehydrochlorination of the starting material. The crude product collected in the traps was passed through a tube packed with soda lime to remove dissolved hydrogen chloride and then through anhydrous calcium sulfate to remove moisture. The dry and acid-free crude product was fractionated through a low-temperature column, and chlorotrifluoroethylene was collected as the fraction boiling at —27.5° to —26.5° C. Infrared analysis showed that the purity of the isolated chlorotrifluoroethylene was greater than 95%.

A sample of chlorotrifluoroethylene was admixed with 0.5% by weight thereof of acetyl peroxide. A white, dense, solid polymer of chlorotrifluoroethylene was obtained by polymerizing the resulting admixture at 25° C. over a period of 27 days. Upon forming this polymer in thin sheets by compressing at about 225° C. under a pressure of the order of 2000 to 3000 pounds per square inch, a tough, flexible, transparent, chemically resistant sheet material resulted.

EXAMPLE 2

The same apparatus and procedure were employed as described under Example 1 with the exception that the reaction tube was maintained at a temperature of 552°–554° C. From a determination of the amount of hydrogen chloride evolved, it was calculated that approximately 12% of the 1,1-dichloro-1,2,2-trifluoroethane had been dehydrochlorinated.

The preparation of a different chlorofluoroethylene of the kind embraced by Formula II, more particularly 1,1-dichloro-2,2-difluoroethylene, is described in Examples 3 and 4.

EXAMPLE 3

*Preparation of 1,1-dichloro-2,2-difluoroethylene*

1,1,2-trichloro-2,2-difluoroethane was thermally dehydrochlorinated at a temperature of 582°–590° C. in the apparatus and following the procedure described under Example 1. The contact time, that is, the average time the trichlorodifluoroethane was in the reaction tube, was 18 seconds. The average conversion per pass as calculated from a determination by titration of the liberated hydrogen chloride was 70%. The pyrolysis products were washed with ice water, dried over anhydrous calcium chloride, and then fractionated to isolate 1,1-dichloro-2,2-difluoroethylene, B. P. 19.5° to 21° C.

EXAMPLE 4

*Preparation of 1,1-dichloro-2,2-difluoroethylene*

This example illustrates the results obtained in the vapor-phase dehydrochlorination of 1,2,2-trichloro-1,1-difluoroethane, using metal and glass apparatus and various conversion temperatures and contact periods.

In one series of runs a metering pump delivered 1,2,2-trichloro-1,1-difluoroethane from a graduated glass reservoir to a stainless steel vaporizer heated to 200° C. by a large bath of fused salts. The vaporized feed passed upwardly through a stainless steel converter or pyrolysis tube, 1½ inches inside diameter and 74 inches long, which was heated by electric furnaces. In Runs 3 and 4, the converter tube was filled with small Raschig rings, which were omitted from the tube in Runs 1 and 2. The pyrolysis products passed downwardly through a water-cooled pipe, 5 feet long, into a receiving vessel packed in Dry Ice. Following the flask were a Dry Ice-acetone cooled trap, two water bubblers and a final Dry Ice-acetone cooled trap.

In another series of runs a Pyrex glass pyrolysis tube, 66 inches long and having an inside diameter of 1.49 inches, was employed. This tube was packed with Raschig rings. A small glass vaporizer, electrically heated to 200°–300° C., was used to vaporize the feed from the pump. The products from the conversion tube were condensed by two glass condensers connected in series. The remainder of the collection apparatus was the same at that described in the preceding paragraph.

The apparatus was flushed out with nitrogen before starting the feed. The temperature distributions in the converter tube were taken during the runs. The temperatures given in the following table were the average temperatures which prevailed throughout a 32-inch section of the tube, and the recorded contact times were calculated on the volume of this section. All collection vessels were weighed before and after each run. Determinations of the acid content of the water bubbles were made by titration with 1.95 N NaOH of aliquot samples after diluting to two liters. All liquid products obtained from the individual runs were combined, washed once or twice with water, and finally with very dilute sodium hydroxide solution. The acid content of the washings also was determined. The washed liquid products were dried by adding anhydrous calcium chloride after which most of them were fractionated either individually or combined with several runs, using a 36-inch helices-packed column, to isolate 1,1-dichloro-2,2-difluoroethylene.

The results are shown in the following table.

Table

*Vapor-phase dehydrochlorination of 1,2,2-trichloro-1,1-difluoroethane*

| Run | Apparatus | Average Converter Temp., °C. | Contact Time, Sec. | Rate of Feed, Mole/min. | Input, g. | Total Products, g. | Moles Acid | Conversion, Per Cent |
|---|---|---|---|---|---|---|---|---|
| 1 | Metal | 591 | 14 | 0.045 | 914 | 694 | 3.13 | 57.8 |
| 2 | do | 445 | 14 | 0.046 | 308 | 300 | 0.01 | 0.6 |
| 3 | do | 463 | 16 | 0.052 | 388 | 334 | 0.28 | 12.3 |
| 4 | do | 588 | 10 | 0.053 | 403 | 311 | 1.63 | 68.5 |
| 5 | Glass | 537 | 65 | 0.020 | 416 | 400 | 2.01 | 81.8 |
| 6 | do | 522 | 74 | 0.029 | 1,410 | 1,371 | 7.11 | 85.4 |
| 7 | do | 503 | 52 | 0.025 | 1,532 | 1,470 | 7.44 | 82.2 |

The yield of $CCl_2=CF_2$ from Run 1 was 30% of the distillation charge and 21% actual yield, which latter was calculated in this and other runs by subtracting the moles of 1,2,2-trichloro-1,1-difluoroethane recovered from the total moles fed to the system and dividing the difference into the moles of $CCl_2=CF_2$ obtained. From Run 2 the yield of $CCl_2=CF_2$ was 5% of the distillation charge and 16% actual yield. The liquid products of Run 3 were not fractionated. The yield of $CCl_2=CF_2$ from Run 4 was 70% of the distillation charge and 50% actual yield. From Run 5 the yield of $CCl_2=CF_2$ was 83.5% of the distillation charge. Since the remainder was not further distilled, the actual yield was not calculated. The liquid products from Runs 6 and 7 were combined with a small amount (about 6% of the total) of liquid products from another run (not reported in the table because of mechanical difficulties with the apparatus that interrupted the run). The yield of $CCl_2=CF_2$ from the combined liquids was 80% of the distillation charge and 78% actual yield.

We claim:

1. In the manufacture of chlorotrifluoroethylene having the formula

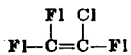

from dichlorotrifluoroethanes having the formula

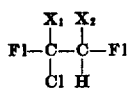

wherein $X_1$ and $X_2$ are substituents selected from the class consisting of fluorine and chlorine, the new and improved method which comprises heating said dichlorotrifluoroethanes to a temperature between 525° C. and 800° C. until thermal dehydrochlorination is effected, and separating the chlorotrifluoroethylene from the resulting mass so obtained.

2. The process of claim 1 wherein the dichlorotrifluoroethane is 1,1- dichloro- 1,2,2- trifluoroethane.

3. The process of claim 1 wherein the dichlorotrifluoroethane is 1,2- dichloro -1,1,2- trifluoroethane.

JOHN J. PADBURY.
PAUL TARRANT.

REFERENCES CITED

The following references are of record in the file of this patent:

FOREIGN PATENTS

| Number | Country | Date |
|---|---|---|
| 581,405 | Great Britain | Oct. 11, 1946 |

OTHER REFERENCES

Torkington et al.: Trans. Faraday Soc., vol. 41, 236–7 (1945).

Certificate of Correction

Patent No. 2,566,807 September 4, 1951

JOHN J. PADBURY ET AL.

It is hereby certified that error appears in the printed specification of the above numbered patent requiring correction as follows:

Column 6, line 13, for "same at" read *same as*; line 25, for "bubbles" read *bubblers*;

and that the said Letters Patent should be read as corrected above, so that the same may conform to the record of the case in the Patent Office.

Signed and sealed this 1st day of January, A. D. 1952.

[SEAL]

THOMAS F. MURPHY,
*Assistant Commissioner of Patents.*